US006697270B1

United States Patent
Kalman et al.

(10) Patent No.: US 6,697,270 B1
(45) Date of Patent: Feb. 24, 2004

(54) ACTIVE DAMPER FOR DC GENERATION SYSTEMS

(75) Inventors: Gabor Kalman, Palos Verdes, CA (US); Colin Huggett, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/236,900

(22) Filed: Sep. 5, 2002

(51) Int. Cl.$^7$ ............................... H02H 7/00; G05F 1/70
(52) U.S. Cl. .......................................... 363/51; 323/207
(58) Field of Search ................................ 323/205, 207; 363/40, 41, 51, 39, 131

(56) References Cited

U.S. PATENT DOCUMENTS

| | | | |
|---|---|---|---|
| 4,730,243 A | * 3/1988 | Glennon | ...................... 363/44 |
| 4,964,027 A | 10/1990 | Cook et al. | |
| 5,014,177 A | 5/1991 | Neuchterlein | |
| 5,038,095 A | 8/1991 | Kirchberg et al. | |
| 5,132,894 A | * 7/1992 | Rozman et al. | ................ 363/51 |
| 5,218,520 A | 6/1993 | Rozman et al. | |
| 5,323,303 A | * 6/1994 | Dolland | ........................ 363/39 |
| 5,349,517 A | 9/1994 | Brennen | |
| 5,377,092 A | 12/1994 | Rowand, Jr. et al. | |
| 5,561,595 A | * 10/1996 | Smith | ........................... 363/37 |
| 5,600,549 A | 2/1997 | Cross | |
| 5,729,163 A | * 3/1998 | McCleary et al. | ........... 327/104 |
| 5,936,855 A | 8/1999 | Salmon | |
| 6,154,090 A | 11/2000 | Wissmach et al. | |
| 6,301,136 B1 | 10/2001 | Huggett et al. | |
| 6,316,920 B1 | * 11/2001 | Huggett et al. | ............. 323/207 |
| 6,329,798 B1 | * 12/2001 | Huggett et al. | ............. 323/207 |
| 6,414,866 B2 | * 7/2002 | Huggett et al. | ............. 363/124 |

OTHER PUBLICATIONS

P. K. Kovacs, "Transient Phenomena in Electrical Machines", Elsevier Science Publishing Co. (1984).

* cited by examiner

*Primary Examiner*—Adolf D. Berhane
(74) *Attorney, Agent, or Firm*—Oral Caglar, Esq.

(57) ABSTRACT

An electrical power system includes a switched reluctance machine/inverter adapted for providing DC power to a load; a voltage controller, which provides a control angle $\theta_C$ to the switched reluctance machine/inverter; an extraction module having an interface to the DC power and providing a resonant frequency content in Park vector format of a resonant frequency content at the interface; a phase locked loop, which provides a transformation angle $\theta$ from the resonant frequency content in Park vector format; a resonant frequency voltage controller, which uses the resonant frequency content in Park vector format and the transformation angle $\theta$ to provide a control angle $\Delta\theta$ to the switched reluctance machine/inverter so that the control angle $\theta_C$ and the control angle $\Delta\theta$ can be used to regulate the DC power and the resonant frequency content is attenuated in regulating the DC power.

24 Claims, 3 Drawing Sheets

ACTIVE DAMPER FOR DC GENERATION SYSTEMS

BACKGROUND OF THE INVENTION

The present invention generally relates to electric power generation systems and, more particularly, to an active damper for direct current electrical power distribution systems of the type used on aircraft.

A typical electrical distribution system for aircraft may supply electricity in the form of direct current (DC) at a voltage on the order of 300 volts (V), which may be written as 300 VDC to indicate that the voltage is measured across a direct current source. Electrical distribution systems on aircraft are subject to requirements limiting the amount of electromagnetic interference, both radiated and conducted, of the system, which may interfere with other electronics systems on the aircraft, and is referred to as electromagnetic interference (EMI). To meet EMI requirements, which are stringent for military aircraft in particular, electrical distribution systems contain LC-type filters, comprised of inductances and capacitances, such as coils and capacitors, to filter out fluctuations, such as harmonics, in the DC current and voltage. The LC filter circuits are prone, however, to harmonic resonance, i.e., such circuits may resonate at certain frequencies.

Power for an aircraft electrical power distribution system may be generated by one or more types of machines. In this description, there is reference to the switched reluctance machine and its associated power electronics, but the concept is equally applicable to other types of machines, such as permanent magnet machines, induction machines and wound field synchronous machines. For example, an SRM-based electrical power generating system, operating at substantially constant speed to deliver 270 VDC to an aircraft electrical distribution system, may be required to supply electrical power for main engine starting through the 270 VDC distribution system. The SRM generator/inverter supplies electrical power to the electrical machine associated with the main engine, which is an SRM-based starter/generator and associated inverter. During main engine starting, the SRM-based starter/generator operates as a motor, accelerating the main engine prior to light off of the main engine.

Both the SRM generator/inverter and the SRM motor/inverter inject some amount of current harmonics into the DC distribution system, despite interfacing with their respective feeders through appropriate EMI filters. The frequency of the harmonics may vary with the speed of the SRM. The SRM generator operates at substantially constant speed, but the SRM motor, i.e., the starter/generator, must accelerate from standstill to main engine light-off speed. At some intermediate speeds, the current harmonics injected by the motor may resonate with some of the LC filter components situated at or near the SRM generator/inverter and the SRM motor/inverter. The amplitude of the resonant currents circulating throughout the electrical power distribution system may become so large as to create unacceptable voltage fluctuation, or ripple, across the DC link capacitors. Such large voltage ripples are unacceptable because they interfere with voltage control of the SRM generator, and may even interfere with the operation of other electrical equipment connected to the distribution system Transport lag, i.e. the time delay required to propagate a signal through a system, is an inherent property of many physical systems. The transport lag time delay can cause deterioration of performance, or limit performance, of control systems used to operate the physical system. Transport lags can be continuous or discrete in form. For example, a continuous transport lag is exemplified by thickness measurement and control in the process of rolling sheets in steel mills. If the rollers and the measurement sensors have to be separated by a significant distance, due, for example, to the environment near the rollers being too hostile for the measurement sensors, a considerable delay, relative to the amount of steel processed through the rollers, results between the thickness measurement of the rolled sheets and the control of the rollers.

A discrete transport lag may be exemplified by the discrete nature of controlling a switched reluctance machine using the switched reluctance machine's turn-on angle. The turn-on angle is measured with respect to the rotor saliency, i.e. the definitiveness of the magnetic flux or direction of the magnetic poles, in the rotor of the switched reluctance machine, also referred to as rotor/stator pole alignment, or the top-dead-center (TDC) of the rotor. The turn-on event can occur only at discrete time intervals. The discrete time intervals are a function of the number of rotor poles and the rotor speed. Consequently, once a decision has been made to excite one phase of an SRM machine, a period of time determined by the stator/rotor saliency and the mechanical speed of the rotor must pass before the next phase can be excited A second example of a discrete transport lag is illustrated by the discrete updates of a microprocessor-based control system. The update rate, or the time between updates, is, in essence, a transport lag time delay that is a function of the speed of the microprocessor and the amount of computation demanded by the control system.

Prior art solutions to the problem of undesirable resonation provided passive damping of the resonating circuits, using resistive components, leading to unavoidable power losses in the electrical power distribution system. The cost, weight, volume, and, most importantly, associated power losses, make the approach of passive damping less than desirable.

As can be seen, there is a need, in electrical power distribution systems, for damping of voltage and current fluctuations that resonate within components of EMI filters. There is also a need, in electrical power distribution systems, for damping of voltage and current fluctuations, which overcomes the limitations of passive damping.

SUMMARY OF THE INVENTION

The present invention provides, in electrical power generation and distribution systems, damping of voltage and current fluctuations to subdue resonation of voltage and current fluctuations with components of EMI filters. The present invention also provides, in electrical power distribution systems, damping of voltage and current fluctuations by means other than passive damping.

In one aspect of the present invention, an electrical power system includes a switched reluctance machine/inverter adapted for providing DC power to a load; a voltage controller, which provides a control angle $\theta_C$ to the switched reluctance machine/inverter; an extraction module having an interface to the DC power and providing a resonant frequency content in Park vector format of a resonant frequency content at the interface; a phase locked loop, which provides a transformation angle $\theta$ from the resonant frequency content in Park vector format; a resonant frequency voltage controller, which uses the resonant frequency content in Park vector format and the transformation angle $\theta$ to provide a control angle Δθ to the switched reluctance machine/inverter so that the control angle $\theta_C$ and the control angle Δθ can be used to regulate the DC power and the resonant frequency content is attenuated in regulating the DC power.

In another aspect of the present invention, an electrical power system includes a switched reluctance machine/inverter adapted for providing DC power to a load; a voltage controller, which provides a control angle $\theta_C$ to the switched reluctance machine/inverter; an extraction module having an interface to the DC power and providing a resonant frequency content in Park vector format of a resonant frequency content at the interface; a phase locked loop, which provides a transformation angle θ from the resonant frequency content in Park vector format; a resonant frequency voltage controller, which uses the resonant frequency content in Park vector format and the transformation angle θ to provide a control angle Δθ; a decoupling module for assuring that the resonant frequency content is not included in the control angle $\theta_C$ provided by the voltage controller; a real part extractor, which provides the real part of the control angle Δθ to the switched reluctance machine/inverter in order to regulate the DC power so that the resonant frequency content is attenuated in regulating the DC power.

In yet another aspect of the present invention, an electrical power system includes: a switched reluctance machine/inverter adapted for providing DC power to a load; a voltage controller, which provides a control angle $\theta_C$; an extraction module having an interface to the DC power and providing a resonant frequency content in Park vector format of a resonant frequency content at the interface; a phase locked loop, which provides a transformation angle θ from the resonant frequency content in Park vector format; a resonant frequency voltage controller, which uses the resonant frequency content in Park vector format and the transformation angle θ to provide a signal referenced to a stationary frame; a decoupling module for assuring that the resonant frequency content is not included in the control angle $\theta_C$ provided by the voltage controller; a transport lag compensator, including a transport lag rotator, which uses a transport lag angle and the signal referenced to a stationary frame from the resonant frequency voltage controller to rotate the signal referenced to a stationary frame by the transport lag angle to provide a control angle Δθ; a real part extractor, which provides the real part of the control angle Δθ; a summer, which adds the real part of the control angle Δθ to the real part of the control angle $\theta_C$ to form a control angle $\theta_T$; and a turn-on angle module, which uses the control angle $\theta_T$ to control the switched reluctance machine/inverter, to regulate the DC power so that the resonant frequency content is attenuated in regulating the DC power.

The extraction module includes: a high pass filter, which passes the resonant frequency content at the interface and blocks lower frequencies; and a Park vector module, connected to the high pass filter and providing the resonant frequency content in Park vector format of the ripple current appearing on the bus.

The phase locked loop includes a vector multiplier which multiplies a unit vector with an estimate angle of the ripple current Park vector with Park vector of the ripple current; a PI-regulator, which regulates the cross-product output of the vector multiplier to zero yielding the estimated angular speed; and an integrator, which integrates the estimated angular speed to provide the transformation angle θ to the resonant frequency voltage controller and to provide the estimate of the transformation angle θ to the vector multiplier.

The resonant frequency voltage controller includes: a rotator, which rotates the resonant frequency content in Park vector format by the transformation angle θ to provide a signal referenced to a synchronous frame; a PI-regulator, which regulates the signal referenced to a synchronous frame against a zero-valued command signal; and a second rotator, which rotates an output signal of the PI-regulator by the negative of the transformation angle θ to provide the signal referenced to a stationary frame.

In a further aspect of the present invention, a method for electrical power distribution includes the steps of: supplying electrical power from a switched reluctance machine/inverter adapted for providing DC power to a load; providing a control angle $\theta_C$ for controlling the switched reluctance machine/inverter; extracting a resonant frequency content from the DC power; providing a resonant frequency content in Park vector format from the resonant frequency content; tracking and providing a transformation angle θ from the resonant frequency content in Park vector format; using the resonant frequency content in Park vector format and the transformation angle θ to provide a signal referenced to a stationary frame; decoupling the resonant frequency content from the control angle $\theta_C$; using a transport lag angle and the signal referenced to a stationary frame to provide a control angle Δθ; extracting the real part of the control angle Δθ; combining the real part of the control angle Δθ with the real part of the control angle $\theta_C$ to form a control angle $\theta_T$ and using the control angle $\theta_T$ to control the switched reluctance machine/inverter, to regulate the DC power so that the resonant frequency content is attenuated in regulating the DC power.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides, in electrical power distribution systems, damping of voltage and current fluctuations to subdue voltage and current resonance with components of EMI filters. By providing active damping, i.e., by actively adjusting the control voltages applied to the SRM generator/inverter based on the voltage and current resonance fluctuations, to regulate the power output of the SRM generator/inverter in response to those voltage and current resonance fluctuations, the present invention avoids the use, for example, of passive damping using resistive components seen in the prior art. Passive damping using resistive components essentially wastes the excess energy produced by resonance by converting it into heat. Thus, by actively controlling the resonant energy rather than wasting it as heat, the present invention avoids the energy losses associated with passive damping. In addition, prior art resistive components required to provide adequate damping in aircraft systems can be large, heavy, and expensive where space, weight, and cost are at a premium in the aircraft environment. Because the present invention, in one embodiment, does not require massive resistive components for converting electrical energy into heat, it can more readily achieve the smaller volume, lighter weight, and lower cost desirable for aircraft power distribution systems.

Figure 1:
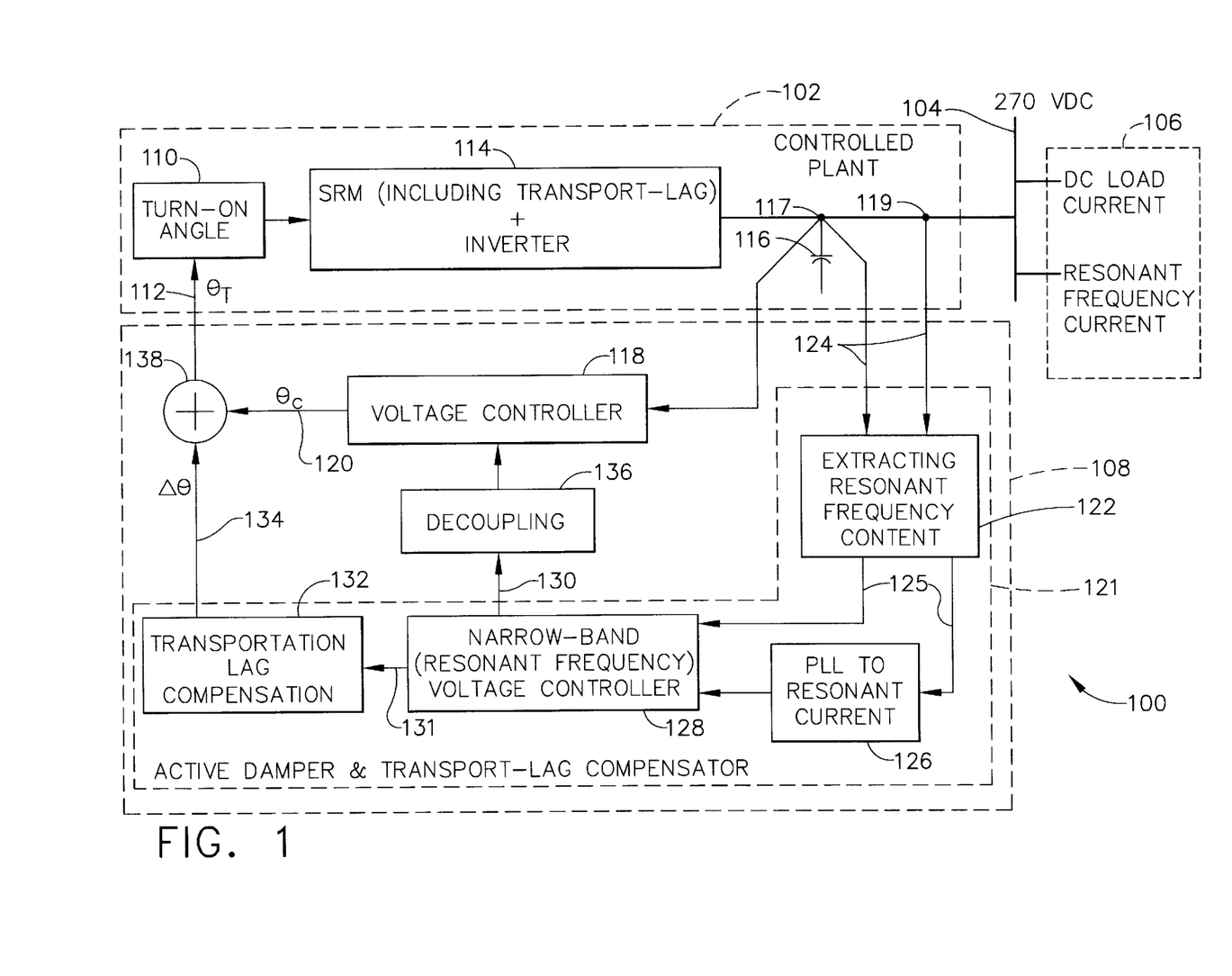
FIG. 1 is a block diagram of an electrical power distribution system with active damping and transport lag compensation, according to one embodiment of the present invention.

Referring now to FIG. 1, electrical power generation system 100 is illustrated. Electrical power generation system 100 includes active damping and transport lag compensation, in accordance with one embodiment. FIG. 1 shows that electrical power generation system 100 may be conceptually divided into a controlled plant 102, comprising an electric power source adapted for providing direct current (DC) power to a load, a bus 104 connecting controlled plant 102 to a load 106, and a voltage control module 108. For example, the DC power may be supplied at 270 Volts DC (VDC), connected by a 270 VDC bus 104 to load 106, as indicated in FIG. 1. Load 106 may comprise various loads, which may be represented as a load current source and resonant frequency current sources, such as caused by resonance or other disturbances. (Note that neither of these representations of the load appear in FIG. 1) Voltage control module 108 may comprise a voltage controller for regulating the power output of controlled plant 102.

Controlled plant 102 may include turn-on angle module 110 for controlling and regulating the power output of controlled plant 102 based on control signal $\theta_T$ 112 received from voltage control module 108. Commands from turn-on angle module 110 are used to control and regulate the power output of switched reluctance machine/inverter 114. As indicated in FIG. 1, switched reluctance machine/inverter 114 may include, i.e. be connected to, an inverter. An inverter connected to switched reluctance machine/inverter 114, for example, may generate, through its control system, 270 Volt direct current (VDC) power, as indicated in FIG. 1. Commands from turn-on angle module 110 may be delayed by transport lags inherent in electrical power distribution system 100, as described above, and indicated in FIG. 1 as transport lag included in switched reluctance machine/inverter 114 in controlled plant 102. DC link capacitor 116 may provide isolation of the power output of switched reluctance machine/inverter 114 from noise, which provides a low impedance for the inverter to operate from, thereby isolating the EMI generated by the SRM/inverter from contaminating the distribution system 104. Current sensors 119 may be provided for sampling, or measuring, current from the power output of switched reluctance machine/inverter 114. Voltage sensors 117 provide feedback from the capacitor and provide signals to voltage control module 108 for the control and regulation of the power output of switched reluctance machine/inverter 114. Current sensor 119 provides DC load current data, including the resonant frequency current content.

Voltage control module 108 may include voltage controller 118 for providing control signal $\theta_C$ 120 for regulating the power output of controlled plant 102. Voltage control module 108 may also include active damper and transport lag compensator 121.

Active damper and transport lag compensator 121 may include extraction module 122, which may receive voltage and current sample measurements from current sensors 119 and voltage sensors 117 through interface 124. The voltage and current sample measurements received through interface 124 from current sensors 119 and voltage sensors 117 may be used by extraction module 122 to provide a resonant frequency content in Park vector format 125. Resonant frequency content in Park vector format 125 may be used to attenuate voltage oscillations in the output DC link capacitor thereby acting as an active damper, and in addition, compensate for the transport time delay associated with the inverter/controller of the machine. The decoupling module 136 provides decoupling between the active damper and transport lag compensator 121, and wide band voltage controller 118.

Active damper and transport lag compensator 121 may include phase locked loop 126 for tracking the frequency of resonant frequency content in Park vector format 125. Active damper and transport lag compensator 121 may include resonant frequency voltage controller 128, which may also be descriptively referred to as a narrow band voltage controller. Resonant frequency voltage controller 128 may use resonant frequency content in Park vector format 125 and the tracked frequency of resonant frequency content in Park vector format 125 to provide decoupling signal 130 and signal referenced to a stationary frame 131. Active damper and transport lag compensator 121 may also include transport lag compensator 132. Transport lag compensator 132 may use signal referenced to a stationary frame 131 to produce control angle $\Delta\theta$ 134.

Voltage control module 108 may also include decoupling module 136. Resonant frequency voltage controller 128 may provide decoupling signal 130 to decoupling module 136 for assuring that any resonant frequency content in Park vector format 125 is not included in control signal $\theta_C$ 120 provided by voltage controller 118. Voltage control module 108 may include summer 138. Transport lag compensator 132 may provide control angle $\Delta\theta$ 134 to summer 138. Summer 138 may combine control angle $\Delta\theta$ 134 with control signal $\theta_C$ 120 to provide control signal $\theta_T$ 112 for controlling and regulating the power output of controlled plant 102.

An introduction to the concept of Park vectors in connection with electrical machines is given by P. K. Kovacs in "Transient Phenomena in Electrical Machines," Elsevier Science Publishing Co. (1984). A voltage controller using Park vectors for eliminating a rotor position sensor in an electrical machine is disclosed in U.S. Pat. No. 6,301,136, entitled "Floating Frame Controller", issued on Oct. 9, 2001, and assigned to the assignee of the present invention. The disclosure in that patent is hereby incorporated by reference into the present application.

Traditionally, Park vectors have been used to represent pure three phase quantities as a complex number in a complex plane. A pure three-phase quantity is defined as one where the algebraic sum of the three phase variables is zero. In this application, the use of the Park vector concept is extended to that of a single-phase variable, in this application the ripple current on the DC bus, i.e., resonant frequency content in Park vector format 125. To those familiar with the art, an arbitrary three phase quantity, current for example, defined in the stationary (or natural) reference frame is computed according to the following equation:

$$\vec{i}_s = \frac{2}{3}(i_a + \vec{a}i_b + \vec{a}^2 i_c)$$

where $\vec{a}$ is the complex number $$\vec{a} = -\frac{1}{2} + j\sqrt{\frac{3}{2}} = e^{j\frac{2\pi}{3}}$$

viewed as a vector in the complex plane and $\vec{a}^2$ is the complex number $$\vec{a}^2 = -\frac{1}{2} - j\sqrt{\frac{3}{2}} = e^{-j\frac{2\pi}{3}}$$

viewed as a vector in the complex plane.

Expanding this representation to a single phase ripple current 125 can be easily accomplished by equating one of the currents, $i_c$, for example, to zero. In addition the $i_a$ is equated to the ripple current, and the variable $i_b$ is equated to the negative ripple current. In this way, a vector representation of the scalar DC ripple current can be achieved.

It is frequently required to transform vectors in the stationary reference frame into a synchronous reference frame. Such transformations enable rotating vectors in the stationary reference frame to be represented as a stationary vector in a synchronous reference frame. For a conventional three-phase quantity, the transformation is based upon extracting the fundamental positive sequence unit vector from a representative quantity, such as the voltage vector, and then referencing all vectors with respect to this fundamental unit vector. The unit vector is in phase with the fundamental of the reference variable. Transformation to the synchronous reference frame is accomplished by multiplying the vector quantity by the complex conjugate of the unit vector, thereby transforming the rotating vector into an essentially stationary vector in the synchronous reference frame.

The transformation of the vector representation of the single-phase quantity (ripple current) requires two reference frames, the so-called positive and negative sequence reference frames. This is because the single-phase variable in vector representation in the stationary reference frame is comprised of two equal magnitude vectors, one rotating in the positive (counter-clockwise) direction, and the other rotating in the negative (clockwise) direction.

Figure 2:
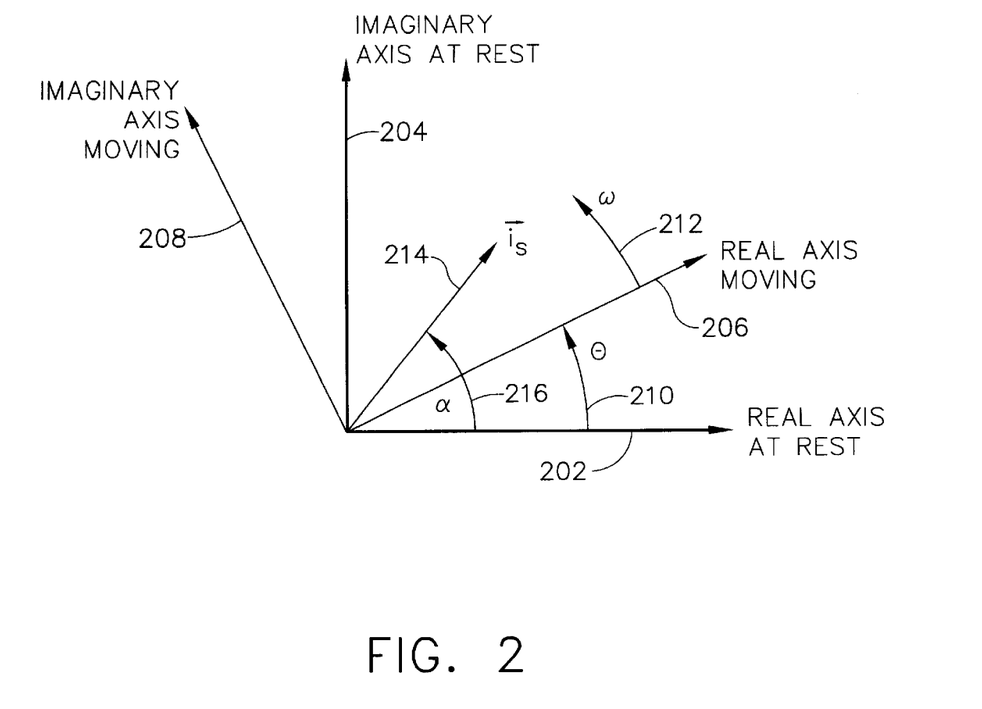
FIG. 2 is an illustration of a Park vector representation of a stator current vector and transformation of the Park vector representation between stationary and moving reference frames.

As seen in FIG. 2, angle $\alpha$ 216 describes the position of Park vector $\vec{i}_S$ 214 relative to the stationary reference frame comprising real axis at rest 202 and imaginary axis at rest 204. Thus, Park vector $\vec{i}_S$ 214 can be represented in the stationary reference frame using polar coordinates as:

$$\vec{i}_S = i_s e^{j\alpha}$$

where $i_S$ is the amplitude, or length, of Park vector $\vec{i}_S$ 214. As seen in FIG. 2, angle $\alpha$ 216 minus transformation angle $\theta$ 210 describes the position of Park vector $\vec{i}_S$ 214 relative to the moving reference frame, which may be a synchronous reference frame, comprising real axis moving 206 and imaginary axis moving 208. Thus, Park vector $\vec{i}_S$ 214 can be represented in the moving, or rotating, reference frame using polar coordinates as:

$$\vec{i}'_S = \vec{i}_S e^{-j\theta}.$$

Figure 3:
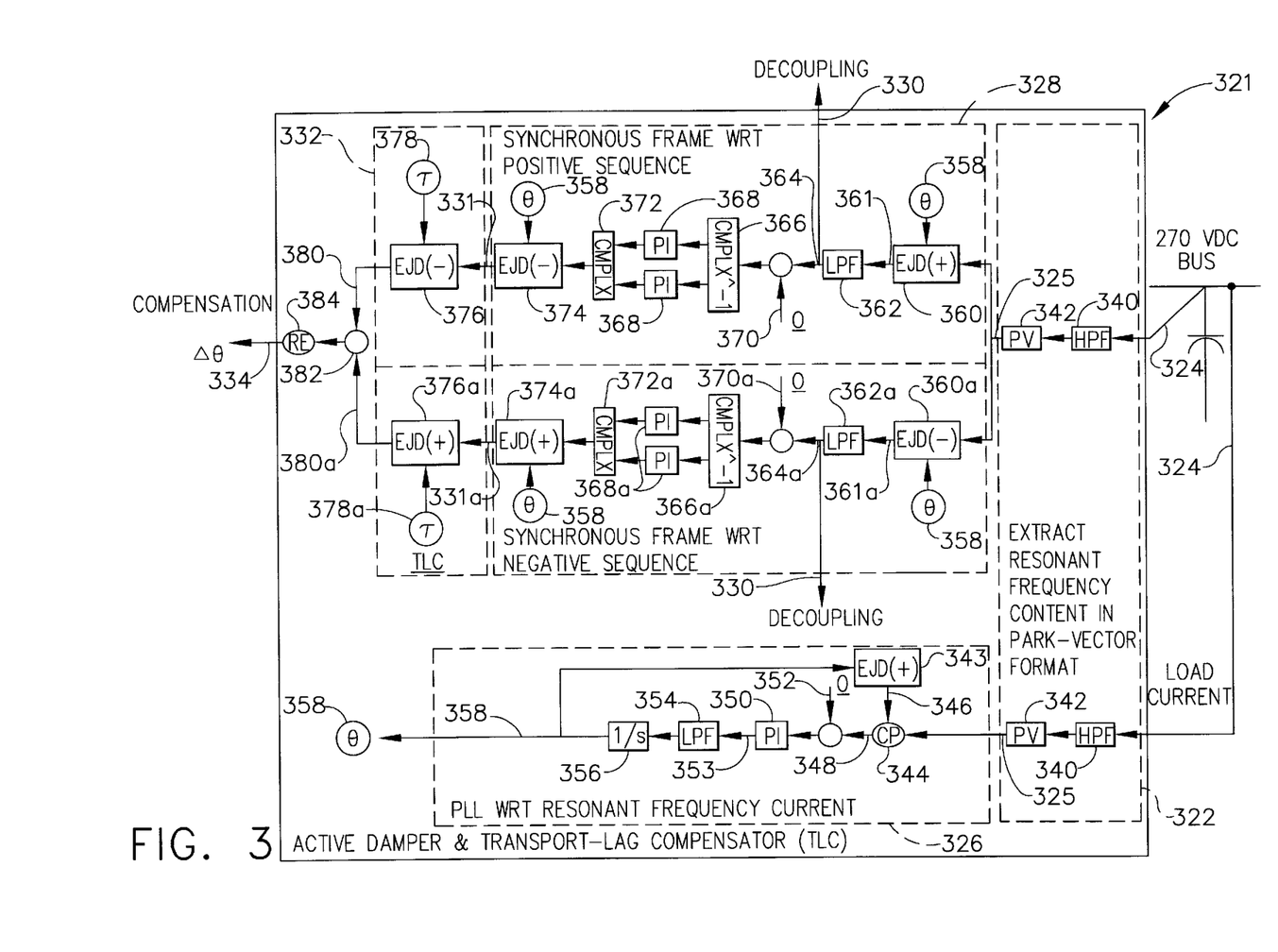
FIG. 3 is a block diagram of an active damper and transport lag compensator, according to one embodiment of the present invention.

Referring now to FIG. 3, active damper and transport lag compensator 321 is illustrated according to one embodiment. Certain features and components corresponding to features and components of electrical power distribution system 100, shown in FIG. 1, are numbered in a manner corresponding to the numbering of FIG. 1. Thus, FIG. 3 shows active damper and transport lag compensator 321 corresponding to active damper and transport lag compensator 121; extraction module 322 corresponding to extraction module 122; interface 324 corresponding to interface 124; resonant frequency content in Park vector format 325 corresponding to resonant frequency content in Park vector format 125; phase locked loop 326 corresponding to phase locked loop 126; resonant frequency voltage controller 328 corresponding to resonant frequency voltage controller 128; decoupling signal 330 corresponding to decoupling signal 130; signal referenced to a stationary frame 331 corresponding to signal referenced to a stationary frame 131; transport lag compensator 332 corresponding to transport lag compensator 132; and control angle $\Delta\theta$ 334 corresponding to control angle $\Delta\theta$ 134 shown in FIG. 1.

As seen in FIG. 3, extraction module 322 may receive voltage and current samples of the DC link voltage and current through interface 324. The DC link voltage and current may contain a resonant frequency content, due to, for example, EMI or harmonic resonance. The resonant frequency content may be extracted by high pass filters 340 and fed to Park vector modules 342 to be converted into Park vector format, as described above, to produce resonant frequency content in Park vector format 325.

Resonant frequency content in Park vector format 325 may be fed to phase locked loop 326 for establishing and providing a synchronous reference frame with respect to resonant frequency content in Park vector format 325. Phase locked loop 326 may provide a synchronous reference frame by providing transformation angle $\theta$ 358 for performing the multiplication by the complex number $e^{-j\theta}$, or exp(−jθ), which provides the transformation between stationary and synchronous reference frames, or the complex number $e^{j\theta}$, or exp(+jθ), which provides the reverse transformation between synchronous and stationary reference frames, and is used, for example, in voltage controller 328 to accomplish this.

Derivation of transformation angle $\theta$ 358 is accomplished by taking the Park vector representation of the ripple current, i.e., resonant frequency content in Park vector format 325, and performing a vector cross product between the Park vector of the resonant frequency content in Park vector format 325 and the unit rotator, exp(+jθ). The result of the vector cross product is a signal which indicates whether the two vectors are in phase (zero output), the Park vector leads the unit rotator vector (positive output), or the Park vector lags the unit rotator vector (negative output). This output is then operated upon by a PI regulator whose output represents estimated electrical frequency of the input vector. This signal, the estimated angular speed 353, is passed through low pass filter (LPF) 354, and then integrated by integrator 356, to produce transformation angle $\theta$ 358. Transformation angle $\theta$ 358 is then used to generate the unit rotator vector used in the vector cross-product computation performed by vector multiplier 344.

As seen in FIG. 3, active damper and transport lag compensator 321 may include resonant frequency voltage controller 328. Resonant frequency voltage controller 328 may receive resonant frequency content in Park vector format 325 referenced to a stationary frame. The stationary frame Park vector of resonant frequency content in Park vector format 325 may be envisioned as having a pulsating amplitude and a constant phase angle so that the stationary frame Park vector may by decomposed into two counterrotating Park vectors representing a positive sequence content and a negative sequence content inherent in the constant phase angle Park vector.

Resonant frequency voltage controller 328 may include rotators 360 and 360a. Resonant frequency content in Park vector format 325 may be fed to rotators 360 and 360a, which may use transformation angle θ 358 provided by phase locked loop 326 to rotate resonant frequency content in Park vector format 325, as generally described above in connection with FIG. 2, into a frame that is synchronous with respect to resonant frequency content in Park vector format 325, i.e., a resonant synchronous frame, to produce signals referenced to a synchronous frame 361 and 361a. For the purposes of the present example used to illustrate one embodiment, signal referenced to a synchronous frame 361 may be considered to be the positive sequence signal representing the positive sequence content inherent in the constant phase angle Park vector, and signal referenced to a synchronous frame 361a may be considered to be the negative sequence signal representing the negative sequence content inherent in the constant phase angle Park vector described above.

Signals referenced to a synchronous frame 361 and 361a may be fed through low pass filters 362 and 362a to produce filtered signals referenced to a synchronous frame 364 and 364a, representing a positive sequence signal and a negative sequence signal, respectively. Filtered signals referenced to a synchronous frame 364 and 364a may be used to provide decoupling signal 330 for assuring that resonant frequency content in Park vector format 325 is not included in control signal $\theta_C$ 120 provided by voltage controller 118. Filtered signals referenced to a synchronous frame 364 and 364a may be fed through inverse complex operators 366 and 366a when regulated against zero-valued command signals 370 and 370a by proportional integral (PI) regulators, PI-regulators 368 and 368a.

For example, Park vector filtered signals referenced to a synchronous frame 364 and 364a are complex numbers having a real part and an imaginary part; each of the real part and the imaginary part of each of filtered signals referenced to a synchronous frame 364 and 364a may be compared to zero-valued command signals 370, 370a to generate an error signal that is regulated by PI-regulators 368 and 368a. The regulated error signals may then be passed through complex operators 372 and 372a and rotated by rotators 374 and 374a. Rotators 374 and 374a may use transformation angle θ 358 provided by phase locked loop 326 to rotate the Park vector of the regulated error signals, which are referenced to a resonant synchronous frame, to produce signals referenced to a stationary frame 331, 331a, in Park vector format. Thus, rotators 374 and 374a perform the reverse operation of rotators 360 and 360a, as generally described above in connection with FIG. 2.

As shown in FIG. 3, active damper and transport lag compensator 321 may include transport lag compensator 332. Transport lag compensator 332 may receive signals referenced to a stationary frame 331, 331a, in Park vector format. Transport lag compensator 332 may also receive transport lag angles 378 and 378a. Transport lag angles 378 and 378a may be determined, for example, so as to account for a transport lag included in switched reluctance machine/inverter 114 and to be commensurate with the frequency of resonant frequency content in Park vector format 325.

Transport lag compensator 332 may include transport lag rotators 376 and 376a. Signals referenced to a stationary frame 331, 331a, in Park vector format, may be fed to transport lag rotator 376 and 376a, which may use transport lag angles 378 and 378a to rotate signals referenced to a stationary frame 331, 331a, in Park vector format, as generally described above in connection with FIG. 2, to produce lag compensated signals referenced to a stationary frame 380 and 380a, which are the output of resonant frequency voltage controller 328 for the positive sequence signal and the negative sequence signal, respectively. Lag compensated signals referenced to a stationary frame 380 and 380a may be fed to summer 382 to recombine the positive sequence and negative sequence portions to form control angle Δθ 334. Only the real part of control angle Δθ 334 is needed so that control angle Δθ 334 may be fed through real part extractor 384 to remove the imaginary part of control angle Δθ 334 to provide the real part of control angle Δθ 334. The real part of control angle Δθ 334 may be fed to summer 138, as described above, to be combined with control signal $\theta_C$ 120 to provide control signal $\theta_T$ 112 for controlling and regulating the power output of controlled plant 102.

Alternatively, it may be recognized that the positive sequence and negative sequence portions of lag compensated signals referenced to a stationary frame 380 and 380a are complex conjugates so that the output of summer 382 is already the real part of control angle Δθ 334. Thus, it is apparent to a person of ordinary skill in the art that only the positive, for example, sequence processing need be performed so that components and signals whose reference numbers are suffixed with "a" may be eliminated along with summer 382, and only the positive sequence lag compensated signal referenced to a stationary frame 380 need be passed through real part extractor 384 to remove the imaginary part of control angle Δθ 334 and provide the real part of control angle Δθ 334. A simplified implementation of resonant frequency voltage controller 328 comprising rotator 360, low pass filter 362, complex operator 366, PI-regulators 368, complex operator 372, rotator 374, rotator 376, and real part extractor 384 may thus be realized and implemented, which eliminates rotator 360a, low pass filter 362a, complex operator 366a, PI-regulators 368a, complex operator 372a, rotator 374a, rotator 376a and summer 382.

It should be understood, of course, that the foregoing relates to preferred embodiments of the invention and that modifications may be made without departing from the spirit and scope of the invention as set forth in the following claims.

We claim:

1. An electrical power system comprising:
   a switched reluctance machine/inverter adapted for providing DC power to a load;
   a voltage controller configured to provide a control angle $\theta_C$ to said switched reluctance machine/inverter;
   an extraction module having an interface to said DC power, said extraction module providing a resonant frequency content in Park vector format of a resonant frequency content at said interface;
   a phase locked loop configured to provide a transformation angle θ from said resonant frequency content in Park vector format;
   a resonant frequency voltage controller configured to use said resonant frequency content in Park vector format and said transformation angle θ to provide a control angle Δθ to said switched reluctance machine/inverter, whereby said control angle $\theta_C$ and said control angle Δθ are used to regulate said DC power and whereby said resonant frequency content is attenuated in regulating said DC power.

2. The electrical power system of claim 1, further comprising a real part extractor for providing the real part of said control angle Δθ.

3. The electrical power system of claim 1, further comprising a real part summer, wherein said resonant frequency content in Park vector format is formed as a positive sequence signal and a negative sequence signal and resonant frequency voltage controller output from said positive sequence signal is added by said summer to resonant frequency voltage controller output from said negative sequence signal for providing the real part of said control angle Δθ.

4. The electrical power system of claim 1, further comprising a transport lag compensator configured to use a transport lag angle and an input from said resonant frequency voltage controller to provide said control angle Δθ to said switched reluctance machine/inverter so as to regulate said DC power.

5. The electrical power system of claim 1, further comprising a decoupling module configured to assure that said resonant frequency content is not included in said control angle $θ_C$ provided by said voltage controller.

6. The electrical power system of claim 1, further comprising a turn-on angle module and a summer, wherein said control angle Δθ is added to said control angle $θ_C$ by said summer to form a control angle $θ_T$, said control angle $θ_T$ is input to said turn-on angle module, and said turn-on angle module uses said control angle $θ_T$ to control said switched reluctance machine/inverter.

7. The electrical power system of claim 1 wherein said extraction module comprises:
- a high pass filter configured to pass said resonant frequency content at said interface and block lower frequencies; and
- a Park vector module connected to said high pass filter and configured to provide said resonant frequency content in Park vector format.

8. The electrical power system of claim 1 wherein said resonant frequency voltage controller comprises:
- a rotator configured to rotate said resonant frequency content in Park vector format by said transformation angle θ to provide a signal referenced to a synchronous frame;
- a PI-regulator configured to regulate said signal referenced to a synchronous frame against a zero-valued command signal; and
- a second rotator configured to rotate an output signal of said PI-regulator by the negative of said transformation angle θ to provide a signal referenced to a stationary frame.

9. The electrical power system of claim 8 wherein said transport lag compensator comprises a rotator configured to rotate said signal referenced to a stationary frame by a transport lag angle to provide said control angle Δθ.

10. The electrical power system of claim 1 wherein said phase locked loop comprises:
- a vector multiplier configured to multiply said resonant frequency content in Park vector format by a negative estimate of said transformation angle θ in Park vector format to provide a synchronous frame signal;
- a PI-regulator configured to regulate said synchronous frame signal against a zero-valued command signal to provide an estimated angular speed; and
- an integrator configured to integrate said estimated angular speed so as to provide said transformation angle θ to said resonant frequency voltage controller and to provide said negative estimate of said transformation angle θ to said vector multiplier.

11. An electrical power system comprising:
- a switched reluctance machine/inverter adapted for providing DC power to a load;
- a voltage controller configured to provide a control angle $θ_C$ to said switched reluctance machine/inverter;
- an extraction module having an interface to said DC power, said extraction module providing a resonant frequency content in Park vector format of a resonant frequency content at said interface;
- a phase locked loop configured to provide a transformation angle θ from said resonant frequency content in Park vector format;
- a resonant frequency voltage controller configured to use said resonant frequency content in Park vector format and said transformation angle θ to provide a control angle Δθ;
- a decoupling module configured to assure that said resonant frequency content is not included in said control angle $θ_C$ provided by said voltage controller;
- a real part extractor configured to provide the real part of said control angle Δθ to said switched reluctance machine/inverter, so as to regulate said DC power and whereby said resonant frequency content is attenuated in regulating said DC power.

12. The electrical power system of claim 11, further comprising a transport lag compensator configured to use a transport lag angle and an input from said resonant frequency voltage controller to provide said control angle Δθ to said switched reluctance machine/inverter so as to regulate said DC power.

13. The electrical power system of claim 11, further comprising a turn-on angle module and a summer, wherein said control angle Δθ is added to said control angle $θ_C$ by said summer to form a control angle $θ_T$, said control angle $θ_T$ is input to said turn-on angle module, and said turn-on angle module uses said control angle $θ_T$ to control said switched reluctance machine/inverter.

14. The electrical power system of claim 11 wherein said extraction module comprises:
- a high pass filter configured to pass said resonant frequency content at said interface and block lower frequencies; and
- a Park vector module connected to said high pass filter and configured to provide said resonant frequency content in Park vector format.

15. The electrical power system of claim 11 wherein said resonant frequency voltage controller comprises:
- a rotator configured to rotate said resonant frequency content in Park vector format by said transformation angle θ to provide a signal referenced to a synchronous frame;
- a PI-regulator configured to regulate said signal referenced to a synchronous frame against a zero-valued command signal; and
- a second rotator configured to rotate an output signal of said PI-regulator by the negative of said transformation angle θ to provide a signal referenced to a stationary frame.

16. The electrical power system of claim 15 wherein said transport lag compensator comprises a rotator configured to rotate said signal referenced to a stationary frame by a transport lag angle to provide said control angle Δθ.

17. The electrical power system of claim 11 wherein said phase locked loop includes
- a vector multiplier configured to multiply said resonant frequency content in Park vector format by a negative estimate of said transformation angle θ in Park vector format to provide a synchronous frame signal;

a PI-regulator configured to regulate said synchronous frame signal against a zero-valued command signal to provide an estimated angular speed; and an integrator configured to integrate said estimated angular speed so as to provide said transformation angle θ to said resonant frequency voltage controller and to provide said negative estimate of said transformation angle θ to said vector multiplier.

18. An electrical power system comprising:

a switched reluctance machine/inverter adapted for providing DC power to a load;

a voltage controller configured to provide a control angle $\theta_C$;

an extraction module having an interface to said DC power, said extraction module providing a resonant frequency content in Park vector format of a resonant frequency content at said interface, wherein said extraction module comprises:
  a high pass filter configured to pass said resonant frequency content at said interface and block lower frequencies; and
  a Park vector module connected to said high pass filter and configured to provide said resonant frequency content in Park vector format;

a phase locked loop configured to provide a transformation angle θ from said resonant frequency content in Park vector format, wherein said phase locked loop comprises:
  a vector multiplier configured to multiply said resonant frequency content in Park vector format by a negative estimate of said transformation angle θ in Park vector format to provide a synchronous frame signal;
  a PI-regulator configured to regulate said synchronous frame signal against a zero-valued command signal to provide an estimated angular speed; and
  an integrator configured to integrate said estimated angular speed so as to provide said transformation angle θ to said resonant frequency voltage controller and to provide said negative estimate of said transformation angle θ to said vector multiplier;

a resonant frequency voltage controller configured to use said resonant frequency content in Park vector format and said transformation angle θ to provide a signal referenced to a stationary frame, wherein said resonant frequency voltage controller comprises:
  a rotator configured to rotate said resonant frequency content in Park vector format by said transformation angle θ to provide a signal referenced to a synchronous frame;
  a PI-regulator configured to regulate said signal referenced to a synchronous frame against a zero-valued command signal; and
  a second rotator configured to rotate an output signal of said PI-regulator by the negative of said transformation angle θ to provide said signal referenced to a stationary frame;

a decoupling module configured to assure that said resonant frequency content is not included in said control angle $\theta_C$ provided by said voltage controller;

a transport lag compensator configured to use a transport lag angle and said signal referenced to a stationary frame from said resonant frequency voltage controller to provide a control angle Δθ, wherein said transport lag compensator comprises a transport lag rotator configured to rotate said signal referenced to a stationary frame by said transport lag angle to provide said control angle Δθ;

a real part extractor configured to provide the real part of said control angle Δθ;

a turn-on angle module and a summer, wherein the real part of said control angle Δθ is added to the real part of said control angle $\theta_C$ by said summer to form a control angle $\theta_T$ and said control angle $\theta_T$ is input to said turn-on angle module and said turn-on angle module uses said control angle $\theta_T$ to control said switched reluctance machine/inverter, so as to regulate said DC power and whereby said resonant frequency content is attenuated in regulating said DC power.

19. A method for power distribution comprising steps of:

supplying electrical power from a switched reluctance machine/inverter adapted for providing DC power to a load;

providing a control angle $\theta_C$ for controlling said switched reluctance machine/inverter;

extracting a resonant frequency content from said DC power;

providing a resonant frequency content in Park vector format from said resonant frequency content;

tracking and providing a transformation angle θ from said resonant frequency content in Park vector format;

using said resonant frequency content in Park vector format and said transformation angle θ to provide a signal referenced to a stationary frame;

decoupling said resonant frequency content from said control angle $\theta_C$;

using a transport lag angle and said signal referenced to a stationary frame to provide a control angle Δθ;

extracting the real part of said control angle Δθ;

combining the real part of said control angle Δθ with the real part of said control angle $\theta_C$ to form a control angle $\theta_T$ and using said control angle $\theta_T$ to control said switched reluctance machine/inverter, so as to regulate said DC power and whereby said resonant frequency content is attenuated in regulating said DC power.

20. The method of claim 19 wherein said step of extracting a resonant frequency content from said DC power comprises using a high pass filter configured to pass said resonant frequency content and block lower frequencies.

21. The method of claim 19 wherein said step of providing a resonant frequency content in Park vector format comprises using a Park vector module connected to said high pass filter and configured to provide said resonant frequency content in Park vector format.

22. The method of claim 19 wherein said tracking step comprises using a phase locked loop, wherein said phase locked loop:

multiplies said resonant frequency content in Park vector format by a negative estimate of said transformation angle θ in Park vector format to provide a synchronous frame signal, uses a PI-regulator to regulate said synchronous frame signal against a zero-valued command signal to provide an estimated angular speed; and integrates said estimated angular speed so as to provide said transformation angle θ and so as to provide said negative estimate of said transformation angle θ to be multiplied by said resonant frequency content in Park vector format for tracking said transformation angle θ.

23. The method of claim 19 wherein said step of using said resonant frequency content in Park vector format and said transformation angle θ to provide a signal referenced to a stationary frame comprises:

rotating said resonant frequency content in Park vector format by said transformation angle θ to provide a signal referenced to a synchronous frame;

using a PI-regulator to regulate said signal referenced to a synchronous frame against a zero-valued command signal; and     rotating an output signal of said PI-regulator by the negative of said transformation angle θ to provide said signal referenced to a stationary frame.

24. The method of claim 19 wherein said step of using a transport lag angle and said signal referenced to a stationary frame to provide a control angle Δθ comprises rotating said signal referenced to a stationary frame by said transport lag angle to provide said control angle Δθ.

\* \* \* \* \*